(12) United States Patent
Tabata et al.

(10) Patent No.: US 8,678,660 B2
(45) Date of Patent: *Mar. 25, 2014

(54) SEALING DEVICE, ROLLING BEARING AND ROLLING BEARING FOR WHEEL

(75) Inventors: Masahiro Tabata, Kashiwara (JP); Kazutoshi Yamamoto, Yamatokoriyama (JP); Kasumi Yamamoto, legal representative, Yamatokoriyama (JP); Syuji Fujita, Tokushima (JP); Shunichi Fujiwara, Tokushima (JP)

(73) Assignees: JTEKT Corporation, Osaka-Shi, Osaka (JP); Koyo Sealing Techno Co., Ltd., Itano-Gun, Tokushima (JP)

( * ) Notice: Subject to any disclaimer, the term of this patent is extended or adjusted under 35 U.S.C. 154(b) by 828 days.

This patent is subject to a terminal disclaimer.

(21) Appl. No.: 12/734,720

(22) PCT Filed: Nov. 19, 2008

(86) PCT No.: PCT/JP2008/070982
§ 371 (c)(1),
(2), (4) Date: May 19, 2010

(87) PCT Pub. No.: WO2009/066676
PCT Pub. Date: May 28, 2009

(65) Prior Publication Data
US 2010/0254647 A1    Oct. 7, 2010

(30) Foreign Application Priority Data
Nov. 20, 2007 (JP) ................. P2007-300332

(51) Int. Cl.
*F16C 33/76* (2006.01)
*F16C 13/00* (2006.01)

(52) U.S. Cl.
USPC .......................................... 384/486; 384/544

(58) Field of Classification Search
USPC ......... 384/477, 481, 482, 484, 486, 544, 589; 277/346, 349, 352, 353, 358, 549, 551, 277/562, 565, 566
See application file for complete search history.

(56) References Cited

U.S. PATENT DOCUMENTS 5,803,617 A * 9/1998 Ohnuki et al. ................ 384/486
7,708,467 B2 * 5/2010 Suzuki .......................... 384/544

(Continued)

FOREIGN PATENT DOCUMENTS

JP  63-82867   5/1988
JP  4-93571    8/1992

(Continued)

OTHER PUBLICATIONS

Notification of Reasons for Refusal, with English translation.

(Continued)

*Primary Examiner* — James Pilkington
(74) *Attorney, Agent, or Firm* — McGinn IP Law Group, PLLC (57) ABSTRACT

A sealing device includes a bottom of an axial concave portion in a surface of an elastic member forming a radial lip, facing away from a flange portion in an axial direction overlaps an end face of a radially-extending portion of a core metal member, facing a tubular portion, in a radial direction. A bottom of a radial concave portion of the elastic member forming the radial lip, facing the tubular portion of a slinger is spaced from the end face of the core metal member toward a flange portion in the axial direction.

7 Claims, 3 Drawing Sheets

(56) References Cited

U.S. PATENT DOCUMENTS

| | | | |
|---|---|---|---|
| 8,202,006 B2 * | 6/2012 | Tabata et al. | 384/484 |
| 2004/0086212 A1 | 5/2004 | Ohtsuki et al. | |
| 2005/0089254 A1 | 4/2005 | Takehara et al. | |
| 2007/0076994 A1 * | 4/2007 | Norimatsu et al. | 384/486 |
| 2009/0257698 A1 * | 10/2009 | Aritake et al. | 384/484 |

FOREIGN PATENT DOCUMENTS

| | | | |
|---|---|---|---|
| JP | 7-34260 | | 6/1995 |
| JP | 2004-169773 | | 6/2004 |
| JP | 2005-325924 | | 11/2005 |
| JP | 2006-349009 | | 12/2006 |
| JP | 2007132454 | * | 5/2007 |
| JP | 2007285322 | * | 11/2007 |
| WO | WO2008004328 | * | 4/2008 |
| WO | WO2008050746 | * | 5/2008 |

OTHER PUBLICATIONS

European Search Report dated Sep. 21, 2011.

* cited by examiner

SEALING DEVICE, ROLLING BEARING AND ROLLING BEARING FOR WHEEL

TECHNICAL FIELD

The present invention relates to a sealing device, and particularly to a sealing device suitably used in a rolling bearing in which raceway members having raceway surfaces comprise only a plurality of tubular members, a rolling bear for a wheel, a water pump or a motor using a rolling bearing. The present invention also relates to a rolling bearing and a rolling bearing for a wheel.

BACKGROUND ART

Conventionally, as a sealing device, there is one described in JP-UM-A-4-93571 Publication (Patent Literature 1).

This sealing device is disposed between an inner race and an outer race of a rolling bearing for a wheel. This sealing device comprises a core metal member, an elastic member fixed to the core metal member, a cross-sectionally L-shaped slinger, and a garter spring. The slinger includes an axially-extending portion, and a radially-extending portion, and the elastic member includes a radial lip always sliding on the axially-extending portion, a first axial lip sliding on the radially-extending portion, and a second axial lip disposed radially inwardly of the first axial lip and sliding on the radially-extending portion. The second axial lip has an annular groove formed in a radially-outward surface thereof.

The garter spring is fitted in the annular groove of the second axial lip. The garter spring presses the second axial lip radially inwardly.

This sealing device is formed such that in a condition in which the second axial lip is not worn, the second axial lip is not in contact with the axially-extending portion, while when the second axial lip is worn, so that a press-contacting force of the second axial lip for the radially-extending portion becomes less than a predetermined force, part of that portion of the second axial lip opposed to the axially-extending portion is brought into contact with the axially-extending portion, so that part of the above opposed portion forms a radial seal.

The second axial lip, when not in a worn condition, functions as an axial seal, while in a worn condition of the second axial lip, part of the above opposed portion of the second axial lip functions as the radial seal, so that this sealing device can continuously maintain a stable sealing function.

Patent Literature 1: JP-UM-A-4-93571 Publication (FIG. 1).

DISCLOSURE OF THE INVENTION

Problem That the Invention is to Solve

The inventor of the present Application has found that problems shown in the following exist in the above sealing device of the conventional construction.

Namely, it has been found that in the conventional sealing device, by always urging the second axial lip radially inwardly by the garter spring, a radially-outward resiliency of the second axial lip becomes large, so that a force of the second axial lip which presses a flange portion of the slinger becomes excessive, and in some cases, a torque becomes excessive.

Furthermore, it has been found that at the radial lip which temporarily undergoes a change of a gas pressure due to a temperature rise or a temperature drop in the interior of the bearing which is a sealed space, a change of the press-contacting force is large, and that in the condition in which the second axial lip is not in contact with the axially-extending portion, the air and lubricant are liable to escape from the interior of the bearing to the exterior of the bearing which is an outside space when the temperature within the bearing rises, while at the time of a temperature drop within the bearing which follows a temperature rise of the bearing, the air and foreign matters (muddy water and so on) are liable to be drawn into the bearing from the exterior of the bearing to intrude into the bearing because the pressure within the bearing becomes negative.

Therefore, an object of the present invention is to provide a sealing device, a rolling bearing and a rolling bearing for a wheel, in which a torque can be reduced, and also the air and lubricant are less liable to escape from the interior of the bearing to the exterior of the bearing, and the air and foreign matters (muddy water and so on) are less liable to intrude into the bearing from the exterior of the bearing.

Means For Solving the Problem

In order to solve the above problem, a sealing device of this invention is characterized in that the device comprises:

a core metal member having a tubular axially-extending portion for being fixed to a first bearing ring, and a radially-extending portion extending from the axially-extending portion in a radial direction of the axially-extending portion;

a slinger having a tubular portion for being fixed to a second bearing ring, and a flange portion extending from the tubular portion in the radial direction and opposed to the radially-extending portion in an axial direction of the tubular portion; and an elastic member having a base portion fixed to the radially-extending portion, and a lip portion which is continuous with the base portion and slides on the slinger; and the lip portion comprises:

a first axial lip extending from the base portion away from the tubular portion in the radial direction and also toward the flange portion in the axial direction and sliding on the flange portion;

a second axial lip which is disposed at a side of the first axial lip, facing the tubular portion in the radial direction, in spaced relation to the first axial lip in the radial direction, and slides on the flange portion; and a radial lip which extends from the base portion away from the flange portion in a direction inclined relative to a center axis of the tubular portion of the slinger, and slides on the tubular portion; and the second axial lip comprises:

a first portion extending from the base portion toward the tubular portion in the radial direction and also toward the flange portion in the axial direction, and a second portion which extends from a distal end of the first portion, facing the flange portion in the axial direction, away from the tubular portion in the radial direction and also toward the flange portion in the axial direction, and slides on the flange portion; and in a non-worn condition of the elastic member after incorporated in the slinger, the second axial lip is disposed in spaced relation to the tubular portion of the slinger in the radial direction, while in a worn condition of the elastic member after incorporated in the slinger and also in a condition in which a press-contacting force of the second axial lip for the flange portion is lowered beyond a predetermined force as a result of wear of the second axial lip, a part of the second axial lip opposed to the tubular portion of the slinger slides on the tubular portion of the slinger; and a bottom of a concave portion in the axial direction formed on a surface of the elastic member forming the radial lip, facing away from the flange portion in the axial direction overlaps ant end face of the radially-extending portion of the core metal member, facing the tubular portion, in the radial direction; and a bottom of a concave portion in the radial direction formed on the elastic member forming the radial lip, facing the tubular portion of the slinger is spaced from the end face of the core metal member toward the flange portion in the axial direction.

The term "extending in the radial direction" means "extending in an extending direction having at least a component extending in the radial direction". Therefore, the term "extending in the radial direction" includes, of course, the case of "extending in an extending direction having only a radially-extending component", and also the case of "extending in an extending direction having both a radially-extending component and an axially-extending component".

Furthermore, the bearing ring means a member having a raceway surface. Therefore, even a member having no inner peripheral surface, such as an inner shaft, is included in the bearing ring if it has a raceway surface.

In the present invention, the bottom of the axial concave portion formed on the surface of the elastic member forming the radial lip, facing away from the flange portion in the axial direction overlaps the end face of the radially-extending portion of the core metal member, facing the tubular portion, in the radial direction, and also the bottom of the radial concave portion formed on the elastic member forming the radial lip, facing the tubular portion of the slinger is spaced from the end face of the core metal member toward the flange portion in the axial direction, and therefore most of the part of the radial lip is disposed to overlap the end face of the core metal member in the radial direction, so that the radial lip is less liable to be deformed. Therefore, regardless of whether the second axial lip is held in contact with the tubular portion of the slinger or not and of whether the gas pressure within the bearing disposed at the anti-flange portion side (that side facing away from the flange portion) of the core metal member in the axial direction is high or low, a press-contacting force of the radial lip is less liable to be varied, and the press-contacting force of the radial lip can always be set to around a desired value.

Therefore, in each specification, by suitably setting the press-contacting force of the radial lip in an initial condition, the torque due to the radial lip can be more reduced than in the past, and also the air and lubricant can always be made less liable to escape from the interior of the bearing to the exterior of the bearing for a long period of time, and further foreign matters (muddy water and so on) can be made less liable to intrude into the bearing from the exterior of the bearing.

Furthermore, in the present invention, the elastic member is kept in a non-contact condition relative to the tubular portion of the slinger until the press-contacting force of the second axial lip for the flange portion is lowered beyond the predetermined force, thus providing a condition in which there exists no radial lip, and therefore the torque can be reduced until the press-contacting force of the second axial lip for the flange portion is lowered beyond the predetermined force. Therefore, a fuel consumption of an automobile or the like having this sealing device can be reduced.

Furthermore, in the present invention, in the condition in which the press-contacting force of the second axial lip for the flange portion is lowered beyond the predetermined force as a result of wear of the second portion of the second axial lip, part of the portion of the second axial lip opposed to the tubular portion of the slinger contacts the tubular portion of the slinger, and slides on the tubular portion, and therefore even when wear of the second axial lip proceeds, the intrusion of foreign matters such as muddy water from the exterior into a chamber, in which rolling elements are disposed in a rolling bearing for a wheel, can be suppressed.

Furthermore, in one embodiment, in the condition before the elastic member is incorporated in the slinger, that surface of the first portion facing the tubular portion in the radial direction is a concave surface, while that surface of the second portion facing the tubular portion in the radial direction is a conical surface or a convex surface.

In the present specification, a conical surface is included in a concave surface, but is not included in a convex surface.

The present inventor has found that in a sealing device of a conventional construction, deformation of that portion of a radially inwardly-disposed axial lip disposed close to a core metal member is large at the time of the incorporation and that stresses concentrate on this portion, so that the durability of this portion is lowered with the result that the life of the sealing device is shortened.

In the above embodiment, the surface of the first portion facing the tubular portion in the radial direction is the concave surface before the elastic member is incorporated into the slinger, and therefore unlike the case where the surface of the first portion facing the tubular portion in the radial direction is a convex surface, it is not necessary that in an initial condition of the incorporated condition, a portion of the first portion of the second axial lip disposed close to the base portion be deformed concentratedly and excessively so that the second axial lip can be disposed in a non-contact condition relative to the tubular portion of the slinger, and by deforming the whole of the first portion generally uniformly in the extending direction thereof, the second axial lip can be held in a non-contact condition relative to the tubular portion of the slinger. Namely, a local excessive stress will not act on part of the first portion, and therefore the durability of the second axial lip can be markedly enhanced, and the life of the sealing device can be prolonged.

Furthermore, in the above embodiment, the surface of the second portion facing the tubular portion in the radial direction is the conical surface or the convex surface in the prior-to-incorporation condition, and therefore as compared with the case where the surface of the second portion facing the tubular portion in the radial direction is a concave surface, the pressure of contact between the second axial lip and the flange portion of the slinger can be reduced, and the wear of the second axial lip can be suppressed. Therefore, a time period before the second axial lip is brought into contact with the tubular portion of the slinger can be prolonged, and therefore the condition in which the torque is small can be maintained for a long period of time as compared with the case where the surface of the second portion facing the tubular portion in the radial direction is a concave surface.

Furthermore, in one embodiment, the surface of the second portion facing the tubular portion in the radial direction is smoothly continuous, and that surface of the radial lip facing the flange portion in the axial direction is smoothly continuous.

That the surface of the second portion facing the tubular portion in the radial direction is smoothly continuous means a condition in which in an axial cross-section of the sealing device, the surface of the second portion facing the tubular portion in the radial direction can be differentiated from one end to the other end, and that the surface of the radial lip facing the flange portion in the axial direction is smoothly continuous means a condition in which in an axial cross-section of the sealing device, the surface of the radial lip facing the flange portion in the axial direction can be differentiated from one end to the other end.

In the above embodiment, the surface of the second portion facing the tubular portion in the radial direction is smoothly continuous, and therefore a stress developing because of deformation of the second axial lip at the time of the incorporation can be distributed generally uniformly by the whole of the second portion and can be borne by it. Further, at the time of the incorporation, the second axial lip can be easily deformed away from the tubular portion in the radial direction (toward the tubular axially-extending portion of the core metal member in the radial direction), and also in a non-worn condition of the first and second axial lips, a predetermined clearance can be easily and accurately formed between the second axial lip and the tubular portion of the slinger.

Furthermore, in the above embodiment, the surface of the radial lip facing the flange portion in the axial direction is smoothly continuous, and therefore a stress developing because of deformation of the radial lip can be distributed generally uniformly by the whole of the radial lip and can be borne by it.

Furthermore, in one embodiment, in the prior-to-incorporation condition, in the axial cross-section, curvature of the surface of the first portion facing the tubular portion in the radial direction is gradually increasing toward the flange portion in the axial direction.

The term "gradually increasing toward the flange portion in the axial direction" includes the case where in the axial cross-section, the surface of the first portion facing the tubular portion in the radial direction includes a portion where the curvature is partially constant, as it extends gradually toward the flange portion in the axial direction. Therefore, for example, this term includes the case where in the axial cross-section, the surface of the first portion facing the tubular portion in the radial direction comprises a conical surface disposed close to the base portion, and a concave surface which is smoothly continuous with this conical surface and is formed by part of a spheroid.

In the above embodiment, in the prior-to-incorporation condition, in the axial cross-section, the curvature of the surface of the first portion facing the tubular portion in the radial direction is gradually increasing toward the flange portion in the axial direction, and therefore a stress developing because of deformation of the second axial lip at the time of the incorporation can be distributed generally uniformly by the whole of the first portion and can be borne by it, and when the non-contact condition of the second axial lip relative to the tubular portion is achieved, a local stress can be positively prevented from concentrating on the first portion.

Furthermore, in one embodiment, a force which the second axial lip receives is only a force from the slinger.

In the above embodiment, the force which the second axial lip receives is only the force from the slinger, and therefore unlike the case where there is a tightening member such as a garter spring, resiliency of the second axial lip directed away from the tubular portion in the radial direction (resiliency of the second axial lip toward the axially-extending portion of the core metal member in the radial direction) will not become excessively large, and the force with which the second axial lip presses the flange portion of the slinger will not become excessive, and the torque will not become excessive.

Furthermore, in the above embodiment, there is no tightening member such as a garter spring for pressing that portion of the second axial lip, opposed to the tubular portion of the slinger, against the tubular portion of the slinger, and therefore as compared with the case where there is a tightening member such as a garter spring, the portion of the second axial lip opposed to the tubular portion of the slinger can be easily spaced apart from the tubular portion at the time of effecting an assembling operation in which the second axial lip is pressed against the flange portion of the slinger.

Furthermore, in one embodiment, a contact point of the radial lip for the tubular portion overlaps the end face of the core metal member in the radial direction.

In the above embodiment, the contact point of the radial lip for the tubular portion overlaps the end face of the core metal member in the radial direction, and therefore as compared with the past, the aging deformation of the radial lip can be further suppressed. Therefore, as compared with the past, the torque due to the radial lip can be further reduced, and also the air and the lubricant can always be made less liable to escape from the interior of the bearing to the exterior of the bearing for a long period of time, and further the air and foreign matters (muddy water and so on) can be made less liable to intrude into the bearing from the exterior of the bearing.

Furthermore, in one embodiment, the bottom of the radial concave portion of the elastic member (forming the radial lip) facing the tubular portion of the slinger overlaps that portion of the base portion, disposed the closest to the tubular portion in the radial direction, in the radial direction.

In the above embodiment, in the elastic member, an extremely radially thickness-reduced portion will not be formed in the vicinity of that side of the radial lip facing the flange portion in the axial direction. Therefore, as compared with the past, the aging deformation of the radial lip can be further suppressed, and also the torque due to the radial lip can be reduced, and further the air and the lubricant can always be made less liable to escape from the interior of the bearing to the exterior of the bearing for a long period of time, and further the air and foreign matters (muddy water and so on) can be made less liable to intrude from the exterior of the bearing into the bearing.

Furthermore, in the above embodiment, the axial dimension of the first portion can be increased. Therefore, a stress developing because of deformation of the second axial lip at the time of the incorporation can be distributed generally uniformly by the whole of the first portion and can be borne by it, and the application of a local excessive stress to a portion of the first portion can be suppressed. Therefore, the durability of the second axial lip can be markedly enhanced, and the life of the sealing device can be prolonged.

A rolling bearing of the present invention is characterized in that the bearing comprises:

a sealing device of the present invention;

an inner ring having at least one raceway surface;

an outer ring having at least one raceway surface; and a plurality of rolling elements disposed between the raceway surface of the inner ring and the raceway surface of the outer ring; and the sealing device is disposed such that it seals an opening in at least one side of a rolling element-mounting chamber in the axial direction which is defined by an outer peripheral surface of the inner ring and an inner peripheral surface of the outer ring and in which the plurality of rolling elements are disposed; and the slinger of the sealing device is fixed to the inner ring; and a seal member comprising the elastic member of the sealing device and the core metal member of the sealing device is fixed to the outer ring.

In the present invention, it is provided with the sealing device of the present invention, and therefore during the operation, the torque of the sealing device can be reduced, and also the escape of the air and the lubricant from the interior of the bearing to the exterior of the bearing can be suppressed, and the intrusion of foreign matters (muddy water and so on) from the exterior of the bearing into the bearing can be suppressed.

A rolling bearing for a wheel according to the present invention is characterized in that the bearing comprises:

a sealing device of the present invention;

an inner shaft having a first raceway surface;

an inner ring fixed to the inner shaft and having a second raceway surface;

an outer ring having a third raceway surface and a fourth raceway surface;

a plurality of first rolling elements disposed between the first raceway surface and the third raceway surface; and a plurality of second rolling elements disposed between the second raceway surface and the fourth raceway surface; and the sealing device is disposed such that it seals an opening in at least one side of a rolling element-mounting chamber in the axial direction which is defined by an inner peripheral surface of the outer ring and those portions of outer peripheral surfaces of the inner shaft and the inner ring opposed to the inner peripheral surface of the outer ring in the radial direction and in which the plurality of rolling elements are disposed; and the slinger of the sealing device is fixed to at least one of the inner ring and the inner shaft; and a seal member comprising the elastic member of the sealing device and the core metal member of the sealing device is fixed to the outer ring.

In the present invention, it is provided with the sealing device of the present invention, and therefore during the operation, the torque of the sealing device can be reduced, and also the escape of the air and the lubricant from the interior of the bearing to the exterior of the bearing can be suppressed, and the intrusion of foreign matters (muddy water and so on) from the exterior of the bearing into the bearing can be suppressed.

Advantage of the Invention

In the sealing device, the rolling bearing and the rolling bearing for the wheel according to the present invention, during the operation, the torque can be reduced, and also the escape of the air and the lubricant from the interior of the bearing to the exterior of the bearing can be suppressed, and the intrusion of the air and foreign matters (muddy water and so on) from the exterior of the bearing into the bearing can be suppressed.

BEST MODE FOR CARRYING OUT THE INVENTION

The present invention will be described below in detail by illustrated embodiments.

Figure 1:
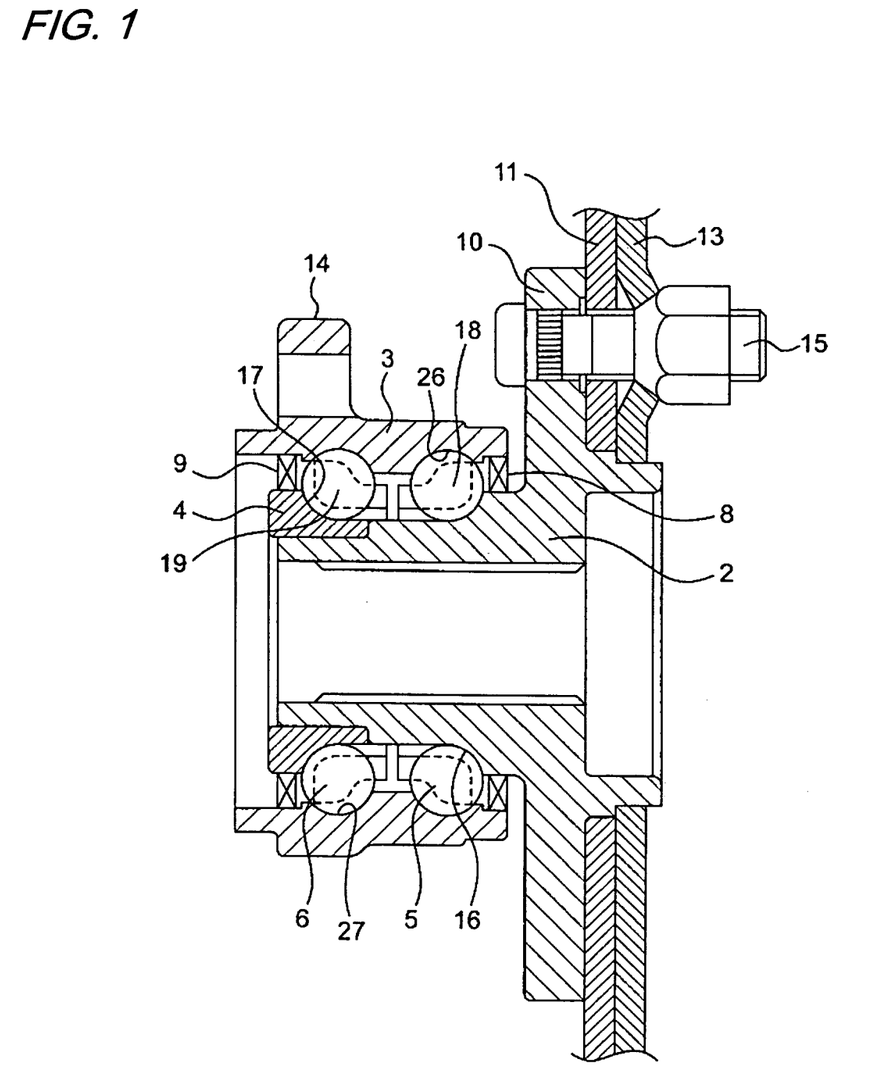
FIG. 1 This is an axial cross-sectional view of a rolling bearing for a wheel which has sealing devices according to one embodiment of the present invention.

FIG. 1 is an axial cross-sectional view of a rolling bearing for a wheel which has sealing devices according to one embodiment of the present invention.

This rolling bearing for the wheel comprises an inner shaft 2, an outer ring 3, an inner ring 4, a plurality of first balls 5, a plurality of balls 6, the first sealing device 8 according to one embodiment of the present invention, and the second sealing device 9 according to one embodiment of the present invention. The first balls 5 form first rolling elements, and the second balls 6 form second rolling elements.

The inner shaft 2 has at its one axial end portion a radially-spreading brake disk-mounting flange 10 of a disk-like shape for the mounting of a brake disk 11 thereon. A plurality of bolt passage holes are formed on a concentric circle having its center disposed substantially at the center of this brake disk mounting flange 10. The brake disk 11 is held against the brake disk mounting flange 10, and further a wheel member 13 is held against the brake disk 11, and in this condition the region between that end face of the wheel member 13 facing away from the brake disc 11 and the brake disk-mounting flange 10 are fixed by a plurality of bolts 15.

The inner ring 4 is externally fitted on the other axial end portion of the inner shaft 2 and is fixed thereto. A first raceway groove 16 of the angular type serving as a first raceway surface is formed at that portion of the inner ring 4 disposed between the inner ring 4 and the brake disk-mounting flange 10, while a second raceway groove 17 of the angular type serving as a second raceway surface is formed in an outer peripheral surface of the inner ring 4.

The outer ring 3 is disposed at that portion of the inner shaft 2, spaced from the brake disk-mounting flange 10 toward the above other end portion, in opposed relation to the inner shaft 2. The outer ring 3 has a radially-spreading vehicle body side-mounting flange 14 disposed at the above other axial end portion. A plurality of bolt passage holes for the insertion of bolts for mounting the vehicle body side-mounting flange 14 on the vehicle body side (knuckle) are formed through this disk-like vehicle body side-mounting flange 14. The outer ring 3 has a third raceway groove 26 of the angular type serving as a third raceway surface and a fourth raceway groove 27 of the angular type serving as a fourth raceway surface which are formed on an inner peripheral surface of the outer ring 3 and are spaced from each other in the axial direction, and the third raceway groove 26 of the angular type is disposed closer to the above one end portion than the fourth raceway groove 27 of the angular type.

The plurality of first balls 5 are disposed between the first raceway groove 16 of the inner shaft 2 and the third raceway groove 26 of the outer ring 3 at predetermined intervals in a circumferential direction in such a condition that the first balls are held by a cage 18. The plurality of second balls 6 are disposed between the second raceway groove 17 of the inner ring 4 and the fourth raceway groove 27 of the outer ring 3 at predetermined intervals in the circumferential direction in such a condition that the second balls are held by a cage 19.

The first sealing device 8 is disposed in the vicinity of an opening of a space between the inner shaft 2 and the outer ring 3 which opening is disposed at the above one axial end portion side (the brake disk-mounting flange (10) side). The first sealing device 8 seals the above one end portion-side opening of the space between the inner shaft 2 and the outer ring 3. On the other hand, the second sealing device 9 is disposed in the vicinity of an opening of a space between the inner ring 4 and the outer ring 3 which opening is disposed at the above other axial end portion side (the opposite side from the brake disk-mounting flange 10). The second sealing device 9 seals the above other end portion-side opening of the space between the inner ring 4 and the outer ring 3. The second sealing device 9 has the same structure as that of the first sealing device 8.

Figure 2:
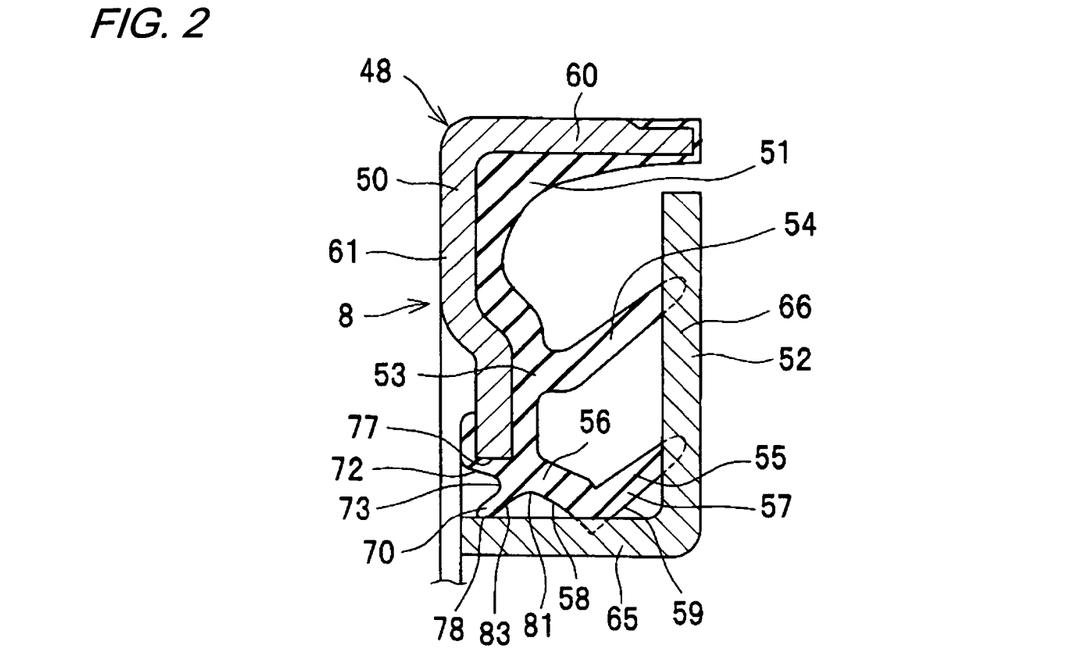
FIG. 2 This is an enlarged cross-sectional view of the whole of the sealing device of the above embodiment.
Figure 3:
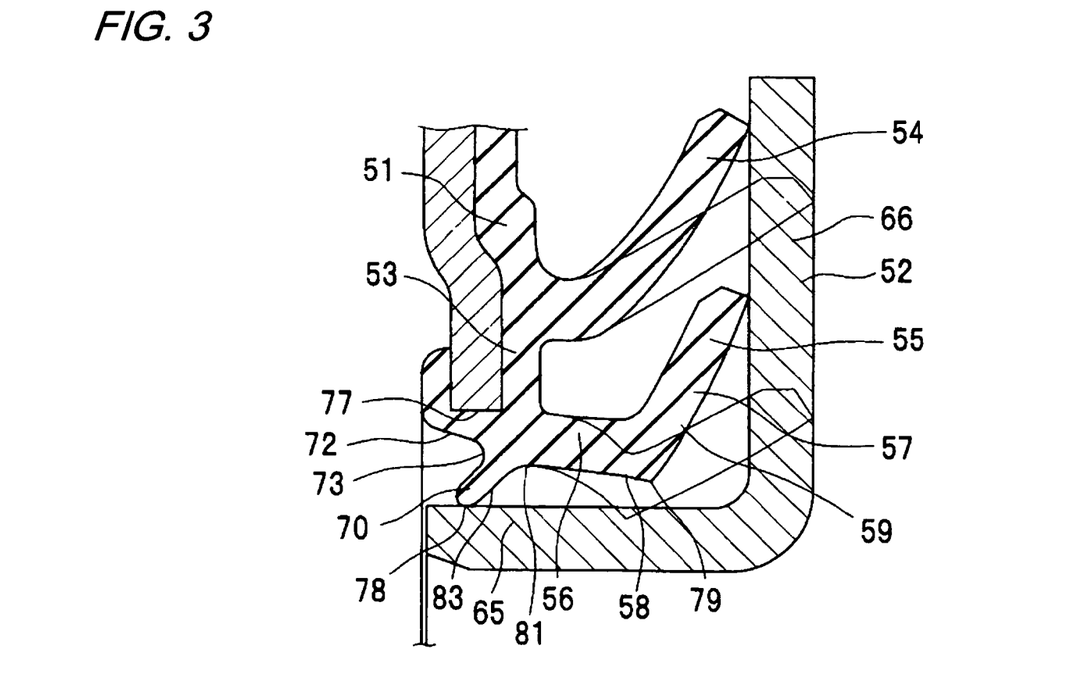
FIG. 3 This is an enlarged cross-sectional view of vicinities of a first and a second axial lip of the sealing device of the above embodiment.

FIG. 2 and FIG. 3 are cross-sectional views for explaining the structure of the first sealing device 8 in detail. Specifically, FIG. 2 is the axial cross-sectional view showing the positional relationship of a core metal member 50, an elastic member 51 and a slinger 52 at their mounted positions. In FIG. 2, as the position of the elastic member 51, the position where the elastic member is disposed in its mounted position assuming that the elastic member 51 does not receive a force from the slinger 52 is shown. On the other hand, FIG. 3 is the cross-sectional view showing the position of the elastic member 51 and the position of the slinger 52 in a condition in which the elastic member 51 is mounted on the slinger 52 and also in a non-worn condition of the elastic member 51 in which it is not worn. The second sealing device 9 has the same structure as that of the first sealing device 8. In a condition in which the left and right sides are reversed in the axial direction in FIG. 2 and FIG. 3, the second sealing device 9 is disposed in the vicinity of the other axial end portion-side opening of the space between the inner ring 4 and the outer ring 3. Explanation of the second sealing device 9 is omitted with the explanation of the first sealing device 8.

As shown in FIG. 2, the first sealing device (hereinafter referred to merely as sealing device) 8 has the core metal member 50, the elastic member 51 and the slinger 52. The core metal member 50 and the elastic member 51 are fixed to each other to be integral with each other. The core metal member 50 and the elastic member 51 form a seal member 48.

The core metal member 50 is formed into an annular shape. The core metal member 50 has a cross-sectionally L-shape. The core metal member includes a tubular axially-extending portion 60, and a radially-extending portion 61. The axially-extending portion 60 is internally fitted to the inner peripheral surface of the outer ring 3 (see FIG. 1; not shown in FIG. 2) serving as a first bearing ring, and is fixed thereto. The radially-extending portion 61 extends radially inwardly from the above other end portion side (the left side in the sheet of FIG. 2, and namely the axially-inward side (the side axially facing the rolling elements)) of an inner peripheral surface of the axially-extending portion 60.

The slinger 52 is formed into an annular shape. The slinger 52 has a cross-sectionally L-shape. The slinger 52 has a tubular portion 65 and a flange portion 66 continuous with the tubular portion 65. The tubular portion 65 is externally fitted to the outer peripheral surface of the inner shaft 2 serving as a second bearing ring, and is fixed thereto. It is needless to say that in the second sealing device 9, the member corresponding to the second bearing ring to which the slinger is fixed is the inner ring 4. The flange portion 66 extends radially outwardly from an axially-outward (right in the sheet) end portion of an outer peripheral surface of the tubular portion 65. The flange portion 66 is disposed axially outwardly of the radially-extending portion 61 of the core metal member 50. Most of the part of the flange portion 66 except a radially-inward portion thereof is axially opposed to the radially-extending portion 61 with a gap formed therebetween.

The elastic member is formed into an annular shape. The elastic member 51 is fixedly secured to the core metal member 50 in such a manner that it covers an entire area of the inner peripheral surface of the axially-extending portion 60 and an entire area of an axially-outward end face of the radially-extending portion 61 continuous with the inner peripheral surface of the axially-extending portion 60. The elastic member has a base portion 53, a first axial lip 54, a second axial lip 55 and a radial lip 70. Specifically, the elastic member 51 is made of a rubber material. As the rubber material, for example, nitrile rubber, nitrile hydride rubber, acrylic rubber, silicone rubber or fluoro rubber can be suitably used.

The base portion 53 is disposed to extend along the inner peripheral surface of the axially-extending portion 60 and the axially-outward end face of the 2 0 radially-extending portion 61. The base portion 53 is fixedly secured to the inner peripheral surface of the axially-extending portion 60 and the outward end face of the radially-extending portion 61. The first axial lip 54 extends from the base portion 53 toward the outer ring 3 (see FIG. 1) and also outwardly in the axial direction (toward the flange portion 66 in the axial direction).

The second axial lip 55 is disposed radially at the inner shaft (2) (see FIG. 1) side (radially inwardly) of the first axial lip 54 in spaced relation to the first axial lip 54 in the radial direction.

The second axial lip 55 has a first portion 56 and a second portion 57. The first portion 56 extends from the base portion 53 radially toward the tubular portion 65 and also axially toward the flange portion 66. The second portion 57 is continuous with an axially-outward (axial flange portion (66)-side) distal end of the first portion 56, and also extends radially toward the outer ring 3 and also axially outwardly.

The radial lip 70 extends from the base portion 53 radially toward the tubular portion 65 (radially toward the inner shaft 2; see FIG. 1) and also toward the axially-inward side (the side facing axially away from the flange portion) of the inner shaft 2, and is adapted to slide on the tubular portion 65 of the slinger 52. In other words, the radial lip 70 extends from the base portion 53 away from the flange portion in a direction inclined relative to the center axis of the tubular portion 65 of the slinger 52, and is adapted to slide on the tubular portion 65. That surface 83 of the radial lip 70 facing the flange portion 66 in the axial direction is smoothly continuous.

As shown in FIG. 2, assuming that the elastic member 51 does not receive a force from the slinger 52, the position of the elastic member 51 overlaps the slinger 52 in its mounted position. Specifically, an axially-outward distal end portion of the first axial lip 54 of the elastic member 51 and an axially-outward distal end portion of the second axial lip 55 of the elastic member 51 overlap the flange portion 66 of the slinger 52, and in the second axial lip 55, a bent portion (part of that portion of the second axial lip 55 opposed to the tubular portion 65 in the radial direction) disposed in the vicinity of a connecting portion between the first portion 56 and the second portion 57 overlaps the tubular portion 65 of the slinger 52.

Furthermore, as shown in FIG. 2, in a condition before the elastic member 51 is incorporated into the slinger 52, a radially-inward surface 58 of the first portion 56 is a concave surface, while a radially-inward surface 59 of the second portion 57 is a conical surface. In the axial cross-section, curvature of the radially-inward surface 58 of the first portion 56 is gradually increasing axially outwardly (toward the flange portion 66 in the axial direction). Specifically, in the axial cross-section, the radially-inward surface 58 of the first portion 56 comprises a generally conical surface-like portion disposed close to the base portion 53, and a portion which is smoothly continuous with this conical surface-like portion and is formed by part of a general spheroid gradually increasing in curvature axially outwardly (toward the flange portion 66 in the axial direction).

In the axial cross-section, the radially-inward surface 59 of the second portion 57 can be differentiated from one end to the other end, and the surface 59 is smoothly continuous.

As shown in FIG. 3, when in the mounted condition, the first axial lip 54 and the second portion 57 of the second axial lip 55 slide on the flange portion 66 of the slinger 52 by a relative rotation of the seal member 48 and the slinger 52 generally about the center axis of the rolling bearing for the wheel.

As shown in FIG. 3, in the mounted condition and in a non-worn condition after the incorporation, the second axial lip 55 is disposed in spaced relation to the tubular portion 65 of the slinger 52 in the radial direction. Namely, as shown in FIG. 2 and FIG. 3, at the time when the mounting is effected, the core metal member 50 and the slinger 52 are moved relative to each other in the axial direction so that the radially-extending portion 61 of the core metal member 50 and the flange portion 66 of the slinger 52 approach each other, and by doing so, the first axial lip 54 and the second portion 57 of the second axial lip 55 move radially outwardly (away from the tubular portion in the radial direction) along the surface of the flange portion 66 of the slinger 52, and therefore the bent portion between the first portion 56 and the second portion 57 moves radially outwardly, so that the bent portion floats radially outwardly off the outer peripheral surface of the tubular portion 65.

As shown in FIG. 3, an axially-outermost first section 73 of an axially-innermost surface 72 of the elastic member 51 radially overlaps that end face 77 of the radially-extending portion 61 of the core metal member 50 facing the tubular portion 65 (see FIG. 1) in the radial direction. In other words, the bottom 73 of an axial concave portion in the surface 72 of the elastic member 51 (forming the radial lip 70) facing away from the flange portion in the axial direction radially overlaps the tubular portion (65)-side end face of the radially-extending portion 61 of the core metal member 50.

Furthermore, in the range of from a contact point 78 of the radial lip 70 for the tubular portion 65 of the slinger 52 to an axially-outermost second section 79 of the first portion 56 in the axial direction, a third section 81 of a radial tubular portion (65)-side end face of the elastic member 50 which is disposed the closest to the outer ring 3 in the radial direction is disposed axially outwardly of the end face 77 of the core metal member 77. In other words, the bottom 81 of the radial concave portion of the elastic member 51 (forming the radial lip 70) facing the tubular portion 65 of the slinger 52 is spaced from the end face 77 of the core metal member 50 toward the flange portion 66 in the axial direction.

Furthermore, the contact point 78 of the radial lip 70 for the tubular portion 65 of the slinger 52 overlaps the end face 77 of the core metal member 50 in the radial direction. Furthermore, the third section (the bottom of the radial concave portion) 81 radially overlaps that portion of the base portion 53 of the elastic member 51 disposed most radially inwardly (radially the closest to the tubular portion 65).

As shown in FIG. 3, a force which the second axial lip 55 receives is only a force from the flange portion 66 of the slinger 52. Namely, in this embodiment, there is no tightening member such as a garter spring for pressing the bent portion radially inwardly, and the second axial lip 55 will not receive a radially-inward force from the tightening member such as a garter spring. In this embodiment, since there is no tightening member such as a garter spring, the bent portion can be easily and positively caused to float off the outer peripheral surface of the tubular portion 65 toward the outer ring 3 in the radial direction. In case there is provided a tightening member such as a garter spring for pressing the bent portion radially inwardly, the bent portion sometimes does not float off the outer peripheral surface of the tubular portion of the slinger toward the outer ring in the radial direction.

As mentioned above, assuming that the elastic member 51 does not receive a force from the slinger 52, the position of the bent portion is so set that it overlaps the tubular portion 65. In a condition in which a press-contacting force of the second axial lip 55 for the flange portion 66 is lowered beyond a predetermined force as a result of wear of the second portion 57 of the second axial lip 55, the bent portion contacts the tubular portion 65 of the slinger 52, and slides on the tubular portion 65 by a relative rotation of the seal member 48 and the slinger 52 generally about the center axis of the rolling bearing for the wheel. Namely, In the condition in which the press-contacting force of the second axial lip 55 for the flange portion 66 is lowered beyond the predetermined force as a result of wear of the second portion 57 of the second axial lip 55, the bent portion plays a role of a radial lip.

A suitable amount of grease serving as lubricant is sealed or coated in a space formed by the first axial lip 54, the second axial lip 55 and the slinger 52, a space surrounded by the second axial lip 55 and the slinger 52 and a space formed by the radial lip 70, the second axial lip 55 and the slinger 52. The portions of the first axial lip 54 and slinger 52 sliding relative to each other, the portions of the second axial lip 55 and slinger 52 sliding relative to each other and the portions of the radial lip 70 and slinger 52 sliding relative to each other are lubricated by the grease.

Furthermore, in FIG. 3, lubricant (grease in this embodiment) is sealed in a rolling element-mounting chamber which leads to a region surrounded by the second axial lip 55 and the slinger 52 and in which the rolling elements (the balls 18, 19 in this embodiment) disposed axially inwardly (left side in the sheet) of the first sealing device 8 are mounted, and the surfaces of the balls 17, 18 (see FIG. 1), the raceway grooves 16, 17, 26, 27 (see FIG. 1) and so on are lubricated.

In the sealing device of the above embodiment, the bottom 73 of the axial concave portion in the surface of the elastic member 51 (forming the radial lip 70) facing away from the flange portion in the axial direction overlaps the end face 77 of the radially-extending portion 61 of the core metal member 50, facing the tubular portion 65, in the radial direction, and also the bottom 81 of the radial concave portion of the elastic member 51 (forming the radial lip 70) facing the tubular portion 65 of the slinger 52 is spaced from the end face 77 of the core metal member 50 toward the flange portion 66 in the axial direction, and therefore most of the part of the radial lip 70 is disposed to overlap the end face 77 of the core metal member 50 in the radial direction, so that the radial lip 70 is less liable to be deformed. Therefore, regardless of whether the second axial lip 55 is held in contact with the tubular portion 65 of the slinger 52 or not and of whether the gas pressure within the bearing is high or low, the press-contacting force of the radial lip 70 is hardly affected by these factors, and is less liable to be varied, and the press-contacting force of the radial lip 70 can always be set to around a desired value.

Therefore, in each specification, by suitably setting the press-contacting force of the radial lip 70 in an initial condition, the torque due to the radial lip 70 can be more reduced than in the past, and also the air and the lubricant can always be made less liable to escape from the interior of the bearing to the exterior of the bearing for a long period of time, and further foreign matters (muddy water and so on) can be made less liable to intrude from the exterior of the bearing into the bearing.

Furthermore, even when the temperature within the bearing increases because of the agitation of the grease or for other reasons, so that the internal pressure within the bearing increases, the direction of the first and second axial lips 54, 55 will not be changed radially outwardly by the flow of the air, and therefore there will not occur a situation in which when the temperature within the bearing decreases thereafter, the first and second axial lips 54, 55 whose direction is changed radially outwardly cause a side-abutting with the result that the press-contacting forces of the first and second axial lips 54, 55 increase. Therefore, the increase of the torque due to the side-abutting of the first and second axial lips 54, 55 will not occur.

Furthermore, in the sealing device of the above embodiment, the elastic member 51 is kept in a non-contact condition relative to the tubular portion 65 of the slinger 52 until the press-contacting force of the second axial lip 55 for the flange portion 66 is lowered beyond the predetermined force, thus providing a condition in which there exists no radial lip, and therefore the torque can be reduced until the press-contacting load of the second axial lip 55 for the flange portion 66 is lowered beyond the predetermined force.

Furthermore, in the sealing device of the above embodiment, in the prior-to-incorporation condition before the elastic member 51 is incorporated into the slinger 52, the radially-inward surface 58 of the first portion 56 is the concave surface, and therefore unlike the case where the first portion is a convex surface, it is not necessary that in a non-worn condition when in the incorporated condition, a portion of the first portion 56 of the second axial lip 55 disposed close to the base portion 53 be deformed concentratedly and excessively so that the second axial lip 55 can be disposed in a non-contact condition relative to the tubular portion 65 of the slinger 52. And, by deforming the whole of the first portion 56 generally uniformly in the extending direction thereof, the second axial lip 55 can be kept in a non-contact condition relative to the tubular portion 65 of the slinger 52. Namely, a local excessive stress will not act on part of the first portion 56, and therefore the durability of the second axial lip 55 can be markedly enhanced, and the life of the sealing device can be prolonged.

Furthermore, in the sealing device of the above embodiment, the radially-inward surface 59 of the second portion 57 is the conical surface in the prior-to-incorporation condition, and therefore as compared with the case where the radially-inward surface of the second portion is a concave surface, the pressure of contact between the second axial lip 55 and the flange portion 66 of the slinger 52 can be reduced, and the wear of the second axial lip 55 can be suppressed. Therefore, a time period before the bent portion of the second axial lip 55 is brought into contact with the tubular portion 65 of the slinger 52 can be prolonged, and the condition in which the torque is small can be maintained for a long period of time as compared with the case where the radially-inward surface of the second portion is a concave surface.

Furthermore, in the sealing device of the above embodiment, the radially-inward surface 59 of the second portion 57 is smoothly continuous, and therefore a stress developing because of deformation of the second axial lip 55 at the time of the incorporation can be distributed generally uniformly over the whole of the second portion 57, and can be borne uniformly by the whole of the second portion 57. Further, at the time of the incorporation, the second axial lip 55 can be easily deformed radially outwardly, and also in a non-worn condition of the second axial lip 55, a predetermined clearance can be easily and accurately formed between the second axial lip 55 and the tubular portion 65 of the slinger 52.

Furthermore, in the sealing device of the above embodiment, the surface 83 of the radial lip 70 facing the flange portion 66 in the axial direction is smoothly continuous, and therefore a stress developing because of deformation of the radial lip 70 can be distributed generally uniformly by the whole of the radial lip 70 and can be borne by it. Further, at the time of the incorporation, the radial lip 70 can be easily deformed axially inwardly.

Furthermore, in the sealing device of the above embodiment, in the prior-to-incorporation condition, in the axial cross-section, the curvature of the radially-inward surface of the first portion 56 is gradually increasing axially outwardly, and therefore a stress developing because of deformation of the second axial lip 55 at the time of the incorporation can be distributed generally uniformly over the whole of the first portion 56, and can be borne uniformly by the whole of the second portion 57, and a local concentration of the stress on the first portion 56 can be positively prevented from occurring. Therefore, the life of the sealing device can be further prolonged.

Furthermore, in the sealing device of the above embodiment, in the condition in which the press-contacting force of the second axial lip 55 for the flange portion 66 is lowered beyond the predetermined force as a result of wear of the second portion 57 of the second axial lip 55, the bent portion contacts the tubular portion 65 of the slinger 52, and slides on the tubular portion 65. Therefore, even when the wear of the second axial lip 55 proceeds, the intrusion of muddy water from the exterior into the ball-mounting chamber of the wheel rolling bearing in which the balls 8, 9 are disposed can be suppressed.

Furthermore, in the sealing device of the above embodiment, the force which the second axial lip 55 receives is only the force from the slinger 52, and there is no tightening member such as a garter spring for pressing the portion of the second axial lip 55, opposed to the tubular portion 65 of the slinger 52, against the tubular portion 65 of the slinger 52. Therefore, as compared with the case where there is a tightening member such as a garter spring for pressing the portion of the second axial lip, opposed to the tubular portion of the slinger, against the tubular portion of the slinger, the portion opposed to the tubular portion 65 of the slinger 52 can be easily spaced apart from the tubular portion 65 at the time of effecting the assembling operation in which the second axial lip 55 is pressed against the flange portion 66 of the slinger 52.

Furthermore, in the sealing device of the above embodiment, the contact point 78 of the radial lip 70 for the tubular portion 65 of the slinger 52 overlaps the radially-inward end face 77 of the radially-extending portion 61 of the core metal member 50 in the radial direction, and therefore the aging deformation of the radial lip 70 can be further suppressed. Therefore, the torque due to the radial lip 70 can be further reduced, and also the air and the lubricant can always be made less liable to escape from the interior of the bearing to the exterior of the bearing for a long period of time, and further foreign matters (muddy water and so on) can be made less liable to intrude into the interior of the bearing from the exterior of the bearing.

In the sealing device of the above embodiment, the bottom 81 of the radial concave portion of the elastic member 51 (forming the radial lip 70) facing the tubular portion 65 of the slinger 52 radially overlaps the end face of the base portion 53 facing the outer ring 2 in the radial direction, and therefore in the elastic member 51, an extremely radially thickness-reduced portion will not be formed in the vicinity of the axially-outward side of the radial lip 70. Therefore, the aging deformation of the radial lip 70 can be further suppressed, and the torque due to the radial lip can be further reduced. Further, the air and the lubricant can always be made less liable to escape from the interior of the bearing to the exterior of the bearing for a long period of time, and also the air and foreign matters (muddy water and so on) can be made less liable to intrude from the exterior of the bearing into the interior of the bearing.

Furthermore, in the sealing device of the above embodiment, the axial dimension of the first portion 56 can be increased. Therefore, a stress developing because of deformation of the second axial lip 55 at the time of the incorporation can be distributed generally uniformly by the whole of the first portion 56 and can be borne by it, and the application of a local excessive stress to a portion of the first portion 56 can be suppressed. Therefore, the durability of the second axial lip 55 can be markedly enhanced, and the life of the sealing device can be prolonged.

Furthermore, the wheel rolling bearing of the above embodiment is provided with the sealing devices 8, 9 of the present invention, and therefore during the operation, the torques of the sealing devices 8, 9 can be reduced, and also the escape of the air and the lubricant from the interior of the bearing to the exterior of the bearing can be suppressed, and the intrusion of foreign matters (muddy water and so on) from the exterior of the bearing into the interior of the bearing can be suppressed.

Furthermore, in the sealing device of the above embodiment, the radially-inward surface 59 of the second portion 57 is the conical surface in the prior-to-incorporation condition. However, in this invention, the radially-inward surface of the second portion may be a convex surface in the prior-to-incorporation condition.

Furthermore, in the sealing device of the above embodiment, in the axial cross-section, the radially inwardly-disposed surface 58 of the first portion 56 which is a concave surface comprises the generally conical surface-like portion disposed close to the base portion 53, and the portion which is smoothly continuous with this conical surface-like portion and is formed by part of the general spheroid gradually increasing in curvature axially outwardly (toward the flange portion 66). However, in this invention, in the axial cross-section, the whole of the radially inwardly-disposed surface of the first portion may comprise a conical surface or a portion formed by part of a spheroid gradually increasing in curvature axially outwardly (toward the flange portion). In this invention, in the axial cross-section, the radially inwardly-disposed surface of the first portion may have any shape in so far as it is formed into such a shape that its curvature is gradually increasing axially outwardly (toward the flange portion).

Furthermore, in the above rolling bearing for the wheel, the sealing devices 8, 9 according to one embodiment of the present invention are disposed in the vicinities of the openings formed respectively at both axial sides of the rolling element (ball)-mounting chamber (lubricant-sealed chamber). However, the sealing device of the present invention may be disposed only in the vicinity of the opening formed at one axial side of the rolling element-mounting chamber (lubricant-sealed chamber). Furthermore, the rolling elements may be rollers instead of the balls, or may employ both balls and rollers. The rolling elements may be rollers instead of the balls, or may be both balls and rollers. The case where the rolling elements are rollers includes the case where the rolling elements are tapered rollers and the case where the rolling elements are cylindrical rollers, but in the case where the rolling elements are rollers, it is preferred that the rolling elements be tapered rollers. The second sealing device 9 according to one embodiment of the present invention is mounted in the vicinity of the other axial end portion-side opening of the space between the inner ring 4 and the outer ring 3, and is mounted at that side where the brake disk-mounting flange 10 does not exist, and therefore the slinger 50 can be easily mounted on the inner ring 4, and the seal member 48 can be easily mounted on the outer ring 3.

Figure 4:
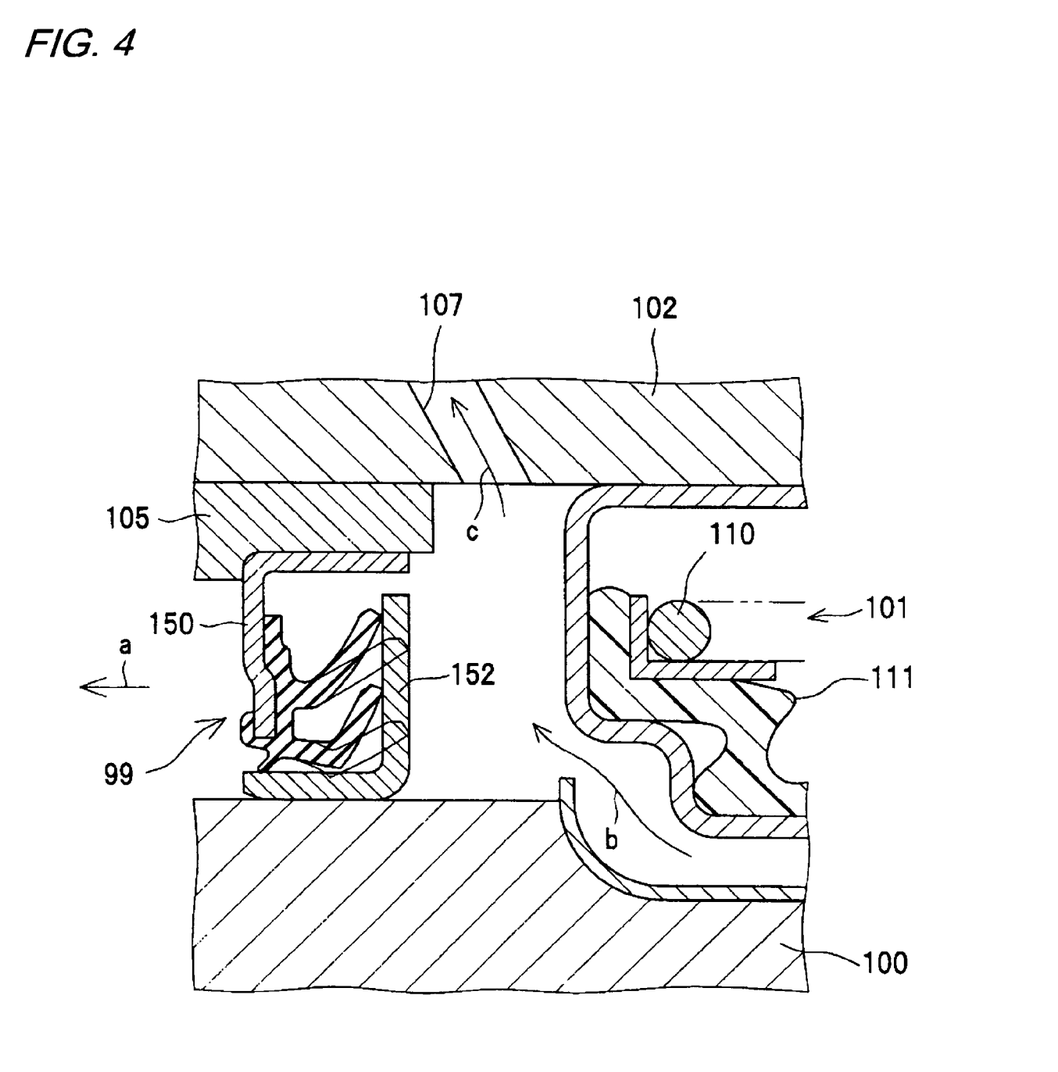
FIG. 4 This is an enlarged cross-sectional view of a water pump provided with a sealing device of the present invention, showing an area around the sealing device.

FIG. 4 is an enlarged cross-sectional view of a water pump provided with a sealing device 99 of the present invention, showing an area around the sealing device 99.

This water pump comprises a pump shaft 100, a mechanical seal 101, a pump housing 102, an outer ring 105, and the sealing device 99 of the present invention. The pump housing 102 has a drain hole 107 extending through the pump housing 102. The outer ring 105 is internally fitted to an inner peripheral surface of the pump housing 102 and is fixed thereto.

The pump shaft 100, the outer ring 105 and the sealing device 99 form part of a water pump bearing of the water pump. Namely, although not shown, at that side of an inner peripheral surface of the outer ring 105 shown by arrow a in FIG. 4, a deep groove-type raceway groove and a cylindrical raceway surface are formed in axially-spaced relation and are arranged in this order from the sealing device 99, while at that side of an outer peripheral surface of the pump shaft 100 shown by arrow a in FIG. 4, a deep groove-type raceway groove and a cylindrical raceway surface are formed in axially-spaced relation and are arranged in this order from the sealing device 99.

A plurality of balls held by a cage are disposed between the raceway groove of the outer ring 105 and the raceway groove of the pump shaft 100 and are arranged at predetermined intervals in a circumferential direction. Also, a plurality of cylindrical rollers held by a cage are disposed between the cylindrical raceway surface of the outer ring 105 and the cylindrical raceway surface of the pump shaft 100 and are arranged at predetermined intervals in the circumferential direction.

A core metal portion 150 of the sealing device 99 is internally fitted to the inner peripheral surface of the outer ring 105 serving as a first bearing ring, and is fixed thereto, while a slinger 152 of the sealing device 99 is externally fitted to the outer peripheral surface of the pump shaft 100 serving as a second bearing ring, and is fixed thereto. The sealing device 99 seals an opening of a space between the outer ring 105 and the pump shaft 100 which opening is disposed close to the mechanical seal 101. In this manner, cooling water of a pump chamber leaking from the mechanical seal 101 in a direction shown by arrow b is prevented from entering the interior of the water pump bearing.

The leaking cooling water of the pump chamber is positively discharged in a direction shown by arrow c to the exterior through the drain hole 107 formed in the pump housing 102. In FIG. 6, 111 denotes a rubber sleeve of the mechanical seal 101, and 110 denotes a coil spring of the mechanical seal 101.

When the sealing device of the present invention is mounted in a water pump as in the water pump shown in FIG. 4, a torque of the sealing device 99 can be reduced during the operation, and also the escape of the air and lubricant from the interior of the bearing to the exterior of the bearing can be suppressed, and the intrusion of the air and foreign matters (muddy water and so on) from the exterior of the bearing into the interior of the bearing can be suppressed.

In the above embodiments, the sealing device of the present invention is set in the sealing device of the rolling bearing for the wheel and the water pump. However, in a rolling bearing in which raceway members having raceway surfaces are an outer ring and an inner ring, the sealing device of the present invention may be disposed so as to seal at least one opening of a space between the outer ring and the inner ring. Furthermore, the sealing device of the present invention may be mounted in a rolling bearing provided between a rotor member and a stator member of a motor, and in this case a running cost of the motor can be reduced.

Furthermore, the sealing device of the present invention can be mounted in any machine in so far as the apparatus includes a first member having an inner peripheral surface, and a second member having an outer peripheral surface, and also the first member and the second member are opposed to each other radially of the inner peripheral surface of the first member. A running cost of the machine having the sealing device of the present invention mounted therein can be reduced, and the sealing ability of the interior of the machine can be enhanced.

According to the present invention, there can be provided the sealing device, the rolling bearing and the rolling bearing for the wheel, in which the torque can be reduced, and also the air and lubricant are less liable to escape from the interior of the bearing to the exterior of the bearing, and the air and foreign matters are less liable to intrude into the bearing from the exterior of the bearing.

The invention claimed is:

1. A sealing device comprising:
    a core metal member having a tubular axially-extending portion for being fixed to a first bearing ring, and a radially-extending portion extending from the axially-extending portion in a radial direction of said axially-extending portion;
    a slinger having a tubular portion for being fixed to a second bearing ring, and a flange portion extending from the tubular portion in said radial direction and opposed to said radially-extending portion in an axial direction of said tubular portion; and
    an elastic member having a base portion fixed to said radially-extending portion, and a lip portion which is continuous with said base portion and slides on said slinger; and
    said lip portion comprises:
        a first axial lip extending from said base portion away from the tubular portion in said radial direction and also toward said flange portion in said axial direction and sliding on said flange portion;
        a second axial lip which is disposed at a side of said first axial lip, facing said tubular portion in said radial direction, in spaced relation to said first axial lip in said radial direction, and slides on said flange portion; and
        a radial lip which extends from said base portion away from the flange portion in a direction inclined relative to a center axis of said tubular portion of said slinger, and slides on said tubular portion; and
    said second axial lip comprises:
        a first portion extending from said base portion toward said tubular portion in said radial direction and also toward said flange portion in said axial direction, and
        a second portion which extends from a distal end of said first portion away from said tubular portion in said radial direction and also toward said flange portion in said axial direction, slides on said flange portion, and faces said flange portion in said axial direction,
    wherein, in a non-worn condition of said elastic member after incorporated in said slinger, said second axial lip is disposed in spaced relation to said tubular portion of said slinger in said radial direction, while in a worn condition of said elastic member after incorporated in said slinger in which a press-contacting force of said second axial lip for said flange portion is lowered beyond a predetermined force as a result of wear of said second axial lip, a part of said second axial lip opposed to said tubular portion of said slinger slides on said tubular portion of said slinger,
    wherein a bottom of a concave portion in said axial direction formed on a surface of said elastic member forming said radial lip, facing away from said flange portion in said axial direction overlaps a middle portion of an end face of said radially-extending portion of said core metal member, facing said tubular portion, in said radial direction,
    wherein a bottom of an other concave portion in said radial direction formed on said elastic member forming said radial lip, facing said tubular portion of said slinger is spaced from said end face of said core metal member toward said flange portion in said axial direction, and
    wherein a force which said second axial lip receives is only a force from said slinger.

2. A sealing device as set forth in claim 1, wherein a surface of said second portion facing said tubular portion in said radial direction is smoothly continuous, and a surface of said radial lip facing said flange portion in said axial direction is smoothly continuous.

3. A sealing device as set forth in claim 1, wherein a contact point of said radial lip for said tubular portion overlaps said end face of said core metal member in said radial direction.

4. A sealing device as set forth in claim 1, wherein the bottom of the other concave portion in said radial direction formed on said elastic member forming said radial lip, facing said tubular portion of said slinger overlaps a portion of said base portion, disposed the closest to said tubular portion in said radial direction, in said radial direction.

5. A sealing device as set forth in claim 1, wherein a majority of the radial lip overlaps said end face of said core metal member in said radial direction.

6. A rolling bearing comprising:
    a sealing device as set forth in claim 1;
    an inner ring having at least one raceway surface;
    an outer ring having at least one raceway surface; and
    a plurality of rolling elements disposed between said raceway surface of said inner ring and said raceway surface of said outer ring; and
    said sealing device is disposed such that it seals an opening in at least one side of a rolling element-mounting chamber in said axial direction which is defined by an outer peripheral surface of said inner ring and an inner peripheral surface of said outer ring and in which said plurality of rolling elements are disposed; and
    said slinger of said sealing device is fixed to said inner ring; and
    a seal member comprising said elastic member of said sealing device and said core metal member of said sealing device is fixed to said outer ring.

7. A rolling bearing for a wheel comprising:
    a sealing device as set forth in claim 1,
    an inner shaft having a first raceway surface;
    an inner ring fixed to said inner shaft and having a second raceway surface;
    an outer ring having a third raceway surface and a fourth raceway surface;
    a plurality of first rolling elements disposed between said first raceway surface and said third raceway surface; and
    a plurality of second rolling elements disposed between said second raceway surface and said fourth raceway surface; and
    said sealing device is disposed such that it seals an opening in at least one side of a rolling element-mounting chamber in said axial direction which is defined by an inner peripheral surface of said outer ring and those portions of outer peripheral surfaces of said inner shaft and said inner ring opposed to the inner peripheral surface of said outer ring in said radial direction and in which said plurality of rolling elements are disposed; and said slinger of said sealing device is fixed to at least one of said inner ring and said inner shaft; and a seal member comprising said elastic member of said sealing device and said core metal member of said sealing device is fixed to said outer ring.

\* \* \* \* \*